US006957693B2

(12) United States Patent
Smith

(10) Patent No.: US 6,957,693 B2
(45) Date of Patent: Oct. 25, 2005

(54) HEAT EXCHANGER THERMAL INDICATOR

(75) Inventor: Willi J. Smith, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 13 days.

(21) Appl. No.: 10/737,381

(22) Filed: Dec. 12, 2003

(65) Prior Publication Data

US 2005/0126751 A1 Jun. 16, 2005

(51) Int. Cl.[7] ............................................. F28F 19/00
(52) U.S. Cl. .................. 165/134.1; 165/166; 374/106; 374/165; 116/206; 116/277
(58) Field of Search ................................. 165/166, 167, 165/134.1, 135; 374/22, 106, 160, 165; 116/206, 116/207, 216, 217

(56) References Cited

U.S. PATENT DOCUMENTS

| | | | |
|---|---|---|---|
| 688,562 A * | 12/1901 | Watkin ...................... 374/160 |
| 977,419 A | 11/1910 | Meier | |
| 1,345,767 A | 7/1920 | Hammond | |
| 2,046,863 A * | 7/1936 | Allphin ...................... 374/102 |
| 2,932,971 A | 4/1960 | Moore et al. | |
| 3,518,961 A * | 7/1970 | Kovac ........................ 116/217 |
| 3,845,662 A | 11/1974 | Surgina et al. | |
| 3,872,821 A | 3/1975 | Harada | |
| 4,023,411 A * | 5/1977 | Escher ........................ 136/233 |
| 4,187,799 A * | 2/1980 | Zwarun ...................... 116/217 |
| 4,353,990 A * | 10/1982 | Manske et al. .......... 435/287.4 |
| 4,386,049 A * | 5/1983 | Tokarz ........................ 376/247 |
| 4,469,452 A | 9/1984 | Sharpless et al. | |
| 4,516,520 A | 5/1985 | Whaley | |
| 4,595,297 A * | 6/1986 | Liu et al. ........................ 374/29 |
| 4,664,056 A | 5/1987 | Jehanno | |
| 4,671,675 A * | 6/1987 | Arisi et al. ................. 374/147 |
| 5,046,447 A | 9/1991 | Steinke et al. | |
| 5,215,704 A * | 6/1993 | Hirota ........................ 376/245 |
| 5,244,276 A * | 9/1993 | Fero et al. ................... 374/102 |
| 5,380,092 A | 1/1995 | Alain | |
| 5,482,000 A | 1/1996 | Ward | |
| 5,954,010 A | 9/1999 | Bullock et al. | |
| 6,616,332 B1 * | 9/2003 | Renken et al. .............. 374/162 |
| 6,694,913 B2 * | 2/2004 | Cooperman ................. 116/216 |

* cited by examiner

*Primary Examiner*—Terrell Mckinnon
(74) *Attorney, Agent, or Firm*—Chris James

(57) ABSTRACT

Thermal indictors of this invention are constructed for use with a heat exchanger generally comprising hot and cold side passages for accommodating a desired heat transfer therebetween. The thermal indicator is disposed at least partially within the heat exchanger and is formed from a material designed to undergo a permanent physical change when exposed to a temperature that is above a heat exchanger design operating temperature.

14 Claims, 1 Drawing Sheet

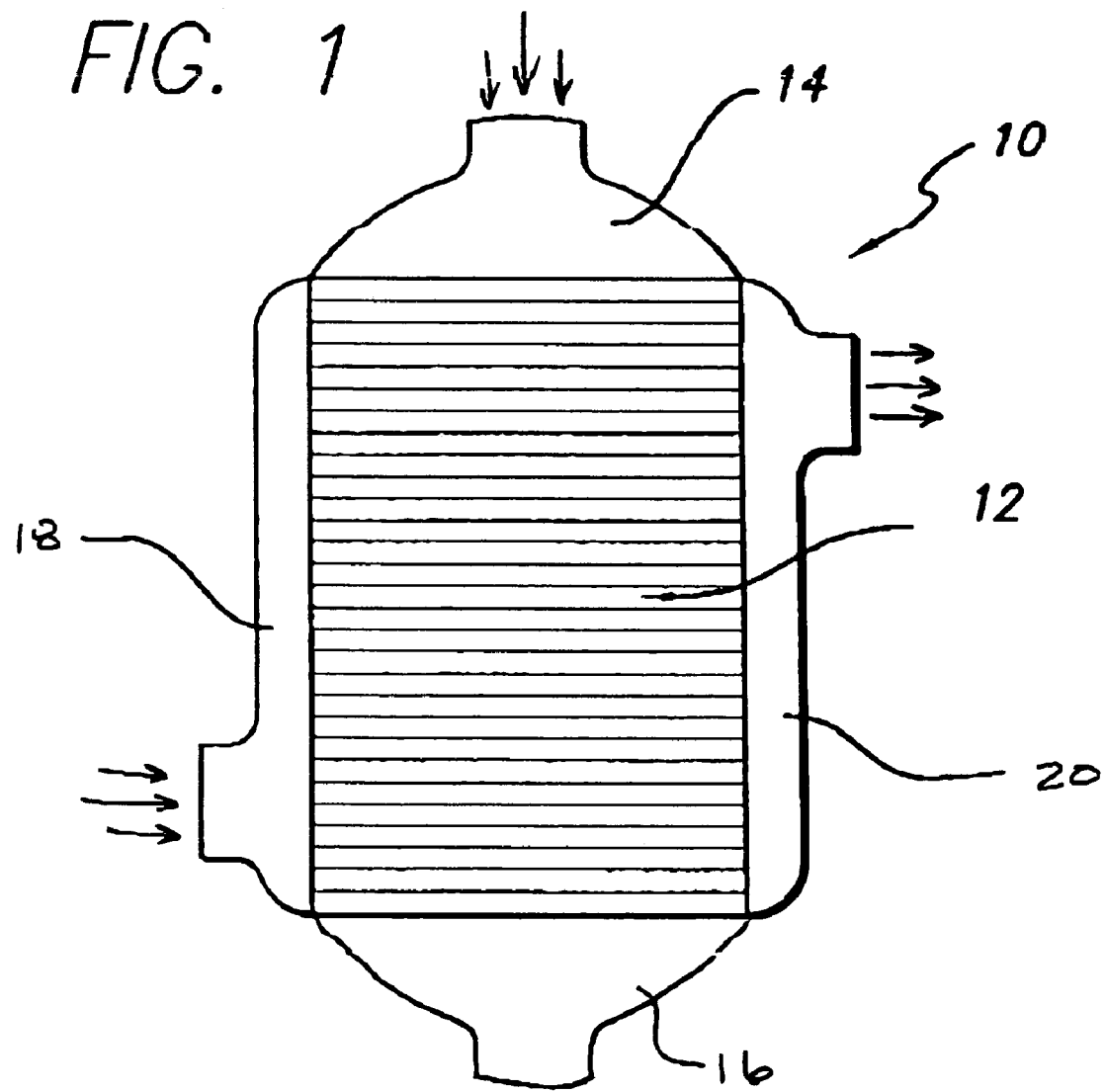

HEAT EXCHANGER THERMAL INDICATOR

FIELD OF INVENTION

This invention relates generally to the field of heat exchangers and, more particularly, to an indicator disposed within the heat exchanger capable of providing an indication of whether the heat exchanger is being used within a defined operating condition.

BACKGROUND OF THE INVENTION

Heat exchangers are well know devices that are used to reduce or increase the temperature of a fluid or gas being directed therethrough. Most commonly, heat exchangers are used to reduce the temperature of a fluid being passed through it so that the cooled fluid or gas can be used for another purpose. Heat exchangers can be used in conjunction with used with internal combustion engines, for example, to reduce the temperature of an exhaust gas stream from an exhaust gas recirculation (EGR) system before being directed into the engine's intake system for combustion, and to reduce the temperature of a pressurized intake air charge in a turbocharged or supercharged system before being directed into the engine's intake system for combination.

Heat exchanger's used for these purposes can make use of air or a liquid as the needed cooling medium, can be configured having a single pass or multi-pass arrangement of passages through which the entering hot side fluid or gas and entering cold side fluid undergo heat exchange. Regardless of the particular heat exchanger construction, all heat exchangers are designed to provide a desired degree of performance within a defined set or operating parameters. These operating parameters typically include the entering hot side fluid or gas temperature and pressure, and the entering cold side fluid temperature and pressure.

The service life of a heat exchanger is greatly influenced by the operating parameters and conditions that it is subjected to. Perhaps the most critical heat exchanger operating parameter is that of the entering hot side fluid or gas temperature. It is well know for heat exchangers to prematurely fail in service when they have been placed in a service where the temperature of the entering hot side fluid exceeds the design temperature. This type of heat exchanger failure can occur over a period of time or can occur instantly, depending on the extent to which the temperature exceeds the design temperature, and depending on whether exposure to the temperature increase is something that is cyclic or steady over time.

Since there is typically no way of monitoring or determining the temperature of an entering fluid or gas stream directed into a heat exchanger placed into use with an internal combustion engine, a user often does not know what caused the heat exchanger to fail. Therefore, once a heat exchanger does fail, the user often goes back to the manufacturer to make a warranty claim. Because it is often difficult for a manufacturer to determine the exact cause of the heat exchanger failure, for the purpose of maintaining customer relations, many manufacturers honor the claim. This occurs despite the fact that the manufacturer may suspect that the heat exchanger has been misused or abused because it is difficult if not impossible to prove.

Attempts have been made to address this problem in the form of using inexpensive instrumentation to monitor or determined the temperature of the incoming hot side fluid stream. Such instrumentation have been configured to monitor the surface temperature of a portion of the heat exchanger or portion of the hot side fluid inlet. However, these external measurement devices do not provide an accurate indication of the temperature seen within the heat exchanger and do not provide an indication of spike or sudden temperature increases, thus have not proven to be that effective.

It is, therefore, desirable that a device be configured that is capable of providing an indication of the operating temperature within a heat exchanger to determine whether the heat exchanger has been subjected to an operating temperature beyond its design temperature. It is further desired that the device be configured in such a manner as to provide a fool proof means of indicating the design temperature has been exceeded to enable the heat exchanger manufacture to know with certainty that the heat exchanger has been subjected to an operating temperature greater than the design temperature.

SUMMARY OF THE INVENTION

Thermal indicators of this invention are constructed for use with a heat exchanger for the purpose of providing a tell tale indication of whether the heat exchanger has been placed into a service and subjected to an operating temperature above a predetermined design temperature. The thermal indicators or thermal abuse indicators can be used with heat exchangers comprising a hot side passage for accommodating passage of a relatively hot fluid or gas therethrough, and a cold side passage for purpose of accommodating passage of a relatively cold fluid or gas therethrough. The hot and cold side passages are configured to permit heat transfer therebetween.

The thermal indicator is disposed at least partially within the heat exchanger and is formed from a material designed to undergo a permanent physical change when exposed to a temperature that is above a heat exchanger design operating temperature. The thermal indicator can be positioned in communication with fluid or gas within the hot or cold side passages, depending on the particular application.

The thermal indicator can be formed from materials selected from the group consisting of polymers, composite, ceramics, cermets, metals, metal alloys and mixtures thereof. In an example embodiment, the thermal indicator is formed from a metal or metal alloy selected from the group consisting of Ag, Cu, Li, Zn, Pd, Ni, Sn, Mn, In, Dc, P, Al, Au and mixtures thereof. The choice of material selected will ultimately depend on the particular thermal indicator means application.

BRIEF DESCRIPTION OF THE DRAWINGS

The invention will be more clearly understood with reference to the following drawing wherein:

FIG. 1 is a schematic side view of a heat exchanger comprising a thermal indicator constructed in accordance with the practice of this invention

DETAILED DESCRIPTION OF THE INVENTION

The invention, constructed in accordance with the principles of this invention, generally comprises a thermally-sensitive indicator, i.e., a thermal indicator, that is configured to be disposed within the heat exchanger, and that is capable of undergoing a physical change when exposed to a predetermined temperature above the heat exchanger operating design temperature. In an example embodiment, the indicator is provided in the form of an element that is disposed within a portion of the heat exchanger exposed to entering hot or cold side fluid or gas, and that is designed to melt or otherwise physically deform when subjected to a predetermined temperature. Configured in this manner, the indicator functions to provide a heat exchanger manufacture with a tell tale sign as to the cause of any resulting heat exchanger failure.

FIG. 1 illustrates an example heat exchanger 10, useful for embodying a thermal indicator of this invention, comprising a core 12 having a plurality of heat transport passages (not shown) therethrough. In this particular embodiment, the heat exchanger includes a hot side fluid or gas inlet manifold 14 for receiving and directing hot fluid or gas into the core and through the passages, and a hot side fluid or gas outlet manifold 16 or receiving fluid or gas that has been cooled for removal from the heat exchanger. A cold side fluid inlet manifold 18 and a cold side fluid outlet manifold 20 are attached at opposite ends of the core for providing cooling fluid to the core via cold side passages, to effect cooling of the hot side fluid as it is passed through the core, and for receiving and removing cooling liquid from the core after it has been heated by the hot side fluid.

Configured in this manner, the hot side fluid or gas entering the heat exchanger via the inlet manifold 14 passes through the heat exchanger passages, and in doing so is cooled by heat transfer from the cooling fluid being passed through the core from the cooling fluid inlet 18 to the cooling fluid outlet 20. Cooled hot side fluid or gas is then collected by the hot side fluid or gas outlet manifold 16 for removal from the heat exchanger.

It is to be understood that the heat exchanger described above and illustrated in FIG. 1 is but one type of heat exchanger, e.g., a core and tank heat exchanger, that can be used in association with thermal indicators of this invention, and that thermal indicators of this invention can be equally well suited for use with other well known types of heat exchanges, e.g., those having a tube and shell construction, stacked plate construction, and/or having an arrangement of plates and bars and the like. Generally speaking, thermal indicators of this invention can be used in any type of heat exchanger that has sufficient space within a portion of the hot side fluid or gas inlet and/or cold side fluid or gas inlet to permit its presence.

As mentioned previously, it is well known that there are instances where the hot side fluid or gas entering the heat exchanger is provided at a temperature that is greater than the design temperature of the heat exchanger. This can occur for a number of reasons, such as by malfunction or tuning of the engine to produce a fluid or gas having a temperature that exceeds the original design, which can cause either a sudden temperature spike or a continuous high temperature. In either case, exposure to such elevated temperature outside of the heat exchanger design is known to cause mechanical damage to the heat exchanger, thereby reducing its effective service life.

Thermal indicators of this invention are configured to permit their placement within a portion of the heat exchanger adjacent the hot or cold side fluid or gas inlet. In an example embodiment, thermal indicators of this invention are used to determine whether the fluid or gas entering the hot side gas inlet is provided at temperatures in excess of the heat exchanger design. It is, however, to be understood that thermal indicators of this invention can be placed adjacent any fluid or gas entry or outlet to provide a tell tale sign of whether the fluid or gas that has entered or exited the heat exchanger was within the design criteria. The thermal indicator can be connected within the heat exchanger so that either a portion of or the entire indicator is placed into contact with the entering hot side fluid or gas inlet stream. In an example embodiment, the thermal indicator is provided as an element that is made from a material that itself is designed to melt or otherwise undergo an irreversible mechanical/physical change when subjected to a predetermined temperature. Ideally, the material that is used to form thermal indicators of this invention have a sufficient mechanical strength at the heat exchanger design temperatures so that the thermal indicator can be retained within the heat exchanger without changing form, becoming damaged, or otherwise becoming unable to provide an indication of excessive thermal energy.

Thermal indicators of this invention are configured to permit their placement within a portion of the heat exchanger adjacent the or cold side fluid or gas inlet. In an example embodiment, thermal indicators of this invention are used to determine whether the fluid or gas entering the hot side gas inlet is provided at temperatures in excess of the heat exchanger design. It is, however, to be understood that thermal indicators of this invention can be placed adjacent any fluid or gas entry or outlet to provide a tell tale sign of whether the fluid or gas that has entered or exited the heat exchanger was within the design criteria. The thermal indicator can be connected within the heat exchanger so that either a portion of or the entire indicator is placed into contact with the entering hot side fluid or gas inlet stream. In an example embodiment, the thermal indicator is provided as an element that is made from a material that itself is designed to melt or otherwise undergo an irreversible mechanical/physical change when subjected to a predetermined temperature. Ideally, the material that is used to form thermal indicators of this invention have a sufficient mechanical strength at the heat exchanger design temperatures so that the thermal indicator can be retained within the heat exchanger without changing form, becoming damaged, or otherwise becoming unable to provide an indication of excessive thermal energy.

Materials useful for forming thermal indicators of this invention include those selected from the group consisting of polymers, composite, ceramics, cermets, metals, metal alloys and mixtures thereof. Again, a feature of any material that is chosen to form the thermal indicator is that it be capable of retaining its form when exposed to heat exchanger design temperatures, and be capable of undergoing a mechanical/physical change when exposed to temperatures above a designated design temperature.

It is desired that thermal indicators of this invention, configured for use with a hot side fluid or gas passage of heat exchangers placed into service with an internal combustion engine, operate within a relevant temperature range of from 200° C. to 800° C. It is to be understood that the heat exchanger design temperature for a particular heat exchanger will vary depending on the particular heat exchanger application, and so too will the indication temperature of the thermal indicator. For example, the design temperature for a particular heat exchanger may be from 315° C. to 650° C., and the thermal indicator temperature will be at some amount over 650° C., e.g., be 695° C. Thus, the thermal indicator placed into use for this particular heat exchanger would be capable of withstanding prolonged exposure to entering hot side fluid or gas within the design temperature of from 315° C. to 650° C. without mechanically/physically changing.

While the temperature ranges for hot side fluid or gas passages within a heat exchanger, and for thermal indicators used in conjunction therewith, have been specifically described above, it is to be understood that thermal indicators of this invention can also be used within the cold side fluid or gas passage of a heat exchanger. In such application, the relevant temperature range may be approximately 95° C. In such application, the thermal indicator would be formed from a material capable of undergoing a physical mechanical change at a temperature somewhat higher than 95° C. In an example embodiment, the thermal indicator can be formed from a metal or metal alloy material selected from the group of metals consisting of Ag, Cu, Li, Zn, Pd, Ni, Sn, Mn, In, Dc, P, Al, Au and mixtures thereof. In a preferred embodiment, the metal alloy is one comprising Ag, Cu, Zn and Pd. In a particularity preferred embodiment, the metal alloy comprises approximately 50 percent by weight Ag, 20 percent by weight Cu, 28 percent by weight Zn, and 2 percent by weight Pd based on the total weight of the metal alloy. This particular metal alloy is one useful for a heat exchanger having the design temperature described above, and is designed to undergo mechanical/physical change at a temperature of above 650° C.

A thermal indicator of this invention is positioned within the heat exchanger to be contacted with an entering hot side fluid or gas inlet stream. It will be understood that the indicator should be positioned at a point in the heat exchanger where it will experience the highest temperature possible. In a preferred embodiment, the indicator is positioned directly in the incoming fluid stream across the hot gas inlet, e.g., it is placed across the hot side fluid or gas inlet throat section.

In an example embodiment, the thermal indicator is provided in the shape of a element, e.g., a strip, a disk, a wafer or the like of a preselected material formed from one of the suitable materials noted above, e.g., a metal alloy specifically chosen for its melting temperature properties. The thermal indicator can be welded or otherwise bonded or adhered inside the heat exchanger. The melting temperature of the alloy should be at or above the predetermined maximum operating limit or critical temperature of the heat exchanger. The melting temperature can be controlled by careful choice of the material used to form the alloy and/or the respective amounts of the materials used to form the alloy. If the heat exchanger has been exposed to an operating temperature above the design operating limit of critical temperature, then the alloy will melt and thereby provide a visual indication that the predetermined critical temperature has been exceeded.

While a particular example embodiment of a heat exchanger comprising a thermal indicator has been described and illustrated, it is to be understood that thermal indicators of this invention can be configured other than described and illustrated, to work with heat exchangers that may be different than that specifically described and illustrated. For example, instead of a separate element, the thermal indicator can be provided in the form of a integral part of the heat exchanger itself. For example, one of the tube passages formed within the heat exchanger can be made from a material designed to provide some type of visual indication of exposure to thermal energy about a predetermined critical temperature. It may or may not provide this indication in combination with presenting a failure mode.

A key feature of thermal indicators of this invention as used with heat exchangers is that they are specifically constructed to undergo permanent physical/mechanical change in response to a predetermined critical temperature to provide a visual indication that the heat exchanger has been exposed to operating conditions beyond design. Constructed in this manner, thermal indicators of this invention provide an important tool in helping to understand the cause of a heat exchanger failure.

Having now described the invention in detail as required by the patent statutes, those skilled in the art will recognize modifications and substitutions to the specific embodiments disclosed herein. Such modifications are within the scope and intent of the present invention.

What is claimed is:

1. A heat exchanger comprising:
   a hot side passage for accommodating passage of a relatively hot fluid or gas therethrough, the hot side passage including a hot side inlet and outlet;
   a cold side passage for accommodating passage of a relatively cold fluid or gas therethrough, the cold side passage including a cold side inlet and outlet, the hot and cold side passages being in contact with one another to permit heat transfer therebetween;
   a thermal indicating means disposed within the heat exchanger and formed from a material designed to undergo permanent physical change when exposed to a predetermined temperature above a heat exchanger design operating temperature;
   wherein the thermal indicating means is positioned proximate one of the hot side inlet and outlet or one of the cold side inlet and outlet.

2. The heat exchanger as recited in claim 1 wherein the thermal indicating means is formed from materials selected from the group consisting of polymers, ceramics, composites cermets, metals, metal alloys, and mixtures thereof.

3. The heat exchanger as recited in claim 1 wherein the thermal indicating means is formed from one or more metals selected from the group consisting of Ag, Cu, Li, Zn, Pd, Ni, Sn, Mn, In, Dc, P, Al, and Au.

4. The heat exchanger as recited in claim 3 wherein the thermal indicating means is selected from a metal alloy comprising Ag, Cu, Zn and Pd.

5. The heat exchanger as recited in claim 1 wherein the thermal indicating means is positioned proximate the hot side inlet or outlet.

6. The heat exchanger as recited in claim 1 wherein the thermal indicating means is positioned proximate the cold side inlet or outlet.

7. The heat exchanger as recited in claim 5 wherein the thermal indicating means is positioned adjacent the hot side inlet.

8. The heat exchanger as recited in claim 6 wherein the thermal indicating means is positioned adjacent the cold side outlet.

9. A method for determining whether a design temperature for a heat exchanger has been exceeded, the method comprising the steps of:
   providing a heat exchanger for receiving a fluid or gas stream and including a hot side passage and a cold side passage, the hot and cold side passages each having respective hot side and cold side inlets and outlets;
   providing a thermal indicator within the heat exchanger that is formed from a material having a predetermined melting temperature above the design temperature, the thermal indicator being positioned adjacent a hot side or cold side inlet or outlet;
   exposing the heat exchanger to heat during operation; and
   visually inspecting the thermal indicator to determine if it has melted.

10. The method as recited in claim 9 wherein during the step of providing a heat exchanger, the thermal indicator is positioned in the hot side inlet or outlet such that it becomes exposed to the fluid or gas stream passing through the heat exchanger hot side passage.

11. The method as recited in claim 9 wherein during the step of providing a thermal indicator, the material used to form the thermal indicator is formed from one or more metals selected from the group consisting of Ag, Cu, Li, Zn, Pd, Ni, Sn, Mn, In, Dc, P, Al, and Au.

12. The heat exchanger as recited in claim 10 wherein the thermal indicator is positioned in the hot side inlet.

13. The method as recited in claim 9 wherein during the step of providing a heat exchanger, the thermal indicator is positioned in the cold side inlet or outlet such that it becomes exposed to the fluid or gas stream passing through the heat exchanger cold side passage.

14. The heat exchanger as recited in claim 13 wherein the thermal indicator is positioned in the cold side outlet.

* * * * *